US012611830B2

(12) United States Patent
De Col et al.

(10) Patent No.: US 12,611,830 B2
(45) Date of Patent: Apr. 28, 2026

(54) PROCESS FOR BUILDING TYRES OF VEHICLE WHEELS AND METHOD FOR PROVIDING ELONGATED ELEMENTS TO BE USED IN THE AFOREMENTIONED PROCESS

(71) Applicant: PIRELLI TYRE S.P.A., Milan (IT)

(72) Inventors: Christian De Col, Milan (IT); Stefano Testi, Milan (IT); Gianni Enrico Portinari, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 18/258,192

(22) PCT Filed: Dec. 28, 2021

(86) PCT No.: PCT/IB2021/062382
§ 371 (c)(1),
(2) Date: Jun. 16, 2023

(87) PCT Pub. No.: WO2022/144768
PCT Pub. Date: Jul. 7, 2022

(65) Prior Publication Data
US 2024/0051250 A1 Feb. 15, 2024

(30) Foreign Application Priority Data

Dec. 29, 2020 (IT) ........................ 102020000032582

(51) Int. Cl.
*B29D 30/00* (2006.01)
*B29D 30/30* (2006.01)

(52) U.S. Cl.
CPC ......... *B29D 30/0016* (2013.01); *B29D 30/30* (2013.01); *B29D 2030/0038* (2013.01); *B65H 2801/93* (2013.01)

(58) Field of Classification Search
CPC ........................... B29D 30/0016; B29D 30/16; B29D 30/1621; B29D 30/1628; B29D 30/26;
(Continued)

(56) References Cited

U.S. PATENT DOCUMENTS 3,623,677 A * 11/1971 Appleby ............ B29D 30/3007
156/395
4,116,401 A * 9/1978 Evert ................... G11B 15/662
(Continued)

FOREIGN PATENT DOCUMENTS

CA 2663546 A1 3/2008
CN 104870177 8/2015
(Continued)

OTHER PUBLICATIONS

Zweers, Evert Hendrik, CN-213568937-U, machine translation. (Year: 2021).*
(Continued)

*Primary Examiner* — Sedef E Paquette
(74) *Attorney, Agent, or Firm* — Steinfl + Bruno LLP

(57) ABSTRACT

A method for arranging elongated elements in a process for building tyres for vehicle wheels, including: arranging a first winding support with a first elongated element of a first type wound on the first winding support; arranging a second winding support with a second elongated element of a second type different from the elongated element of the first type wound on the second winding support; arranging a coupling device including a first coupling body and a second coupling body rotatable with respect to one another about a rotation axis; and arranging the first winding support on the first coupling body and the second winding support on the second coupling body.

12 Claims, 5 Drawing Sheets

(58) Field of Classification Search
  CPC ........................... B29D 30/30; B29D 30/3021;
            B29D 30/3028; B29D 30/38; B29D
            30/42; B29D 2030/0038; B65H 2801/93
  USPC ..................................... 156/110.1, 117, 123
  See application file for complete search history.

(56) References Cited

U.S. PATENT DOCUMENTS

| | | | |
|---|---|---|---|
| 5,775,630 | A | 7/1998 | Hogberg et al. |
| 2008/0036120 | A1 | 2/2008 | Lacagnina |
| 2011/0168322 | A1 | 7/2011 | Mariani et al. |
| 2014/0034220 | A1 | 2/2014 | Mancini et al. |
| 2015/0283771 | A1 | 10/2015 | Fabbretti et al. |
| 2015/0343730 | A1 | 12/2015 | Marchini et al. |
| 2024/0034014 | A1 | 2/2024 | De Col et al. |
| 2024/0066820 | A1 | 2/2024 | De Col et al. |

FOREIGN PATENT DOCUMENTS

| | | | |
|---|---|---|---|
| CN | 107107502 | A | 8/2017 |
| CN | 107107505 | A | 8/2017 |
| CN | 107214987 | A | 9/2017 |
| CN | 108996297 | A | 12/2018 |
| CN | 109296704 | A | 2/2019 |
| CN | 213568937 | U * | 6/2021 |
| EP | 1236669 | A1 | 9/2002 |
| EP | 1629964 | A2 | 3/2006 |
| JP | H05293912 | A | 11/1993 |
| JP | H10296875 | A | 11/1998 |
| JP | 2009023508 | A | 2/2009 |
| WO | 2011/101738 | A1 | 8/2011 |
| WO | 2012/017399 | A1 | 2/2012 |
| WO | 2012/085776 | A1 | 6/2012 |
| WO | 2014/011033 | A1 | 1/2014 |
| WO | 2015/097578 | A1 | 7/2015 |
| WO | 2015/097579 | A1 | 7/2015 |
| WO | 2016/103077 | A1 | 6/2016 |
| WO | 2022/144766 | A1 | 7/2022 |
| WO | 2022/144768 | A1 | 7/2022 |
| WO | 2022/144770 | A1 | 7/2022 |

OTHER PUBLICATIONS

International Search Report and Written Opinion for International Application No. PCT/IB2021/062379 filed on Dec. 28, 2021 on behalf of Pirelli Tyre S.P.A. Mail Date: Apr. 22, 2022 14 pages.

International Search Report and Written Opinion for International Application No. PCT/IB2021/062382 filed on Dec. 28, 2021 on behalf of Pirelli Tyre S.P.A. Mail Date: Apr. 22, 2022 13 pages.

International Search Report and Written Opinion for International Application No. PCT/IB2021/062387 filed on Dec. 28, 2021 on behalf of Pirelli Tyre S.P.A. Mail Date: May 3, 2022 13 pages.

Saudi Arabian Examination Report for SA Application No. 523441366 filed on Dec. 28, 2021 on behalf of Pirelli Tyre S.P.A. Mail Date: Dec. 28, 2023 (English + Original) 10 pages.

First Chinese Office Action for Chinese Application No. 202180088105.5 filed on Dec. 28, 2021 on behalf of Pirelli Tyre S.P.A. Mail Date: Oct. 26, 2023 13 pages (English + Original).

Saudi Arabian Examination Report for Application No. 523441366 filed on May 24, 2022 on behalf of Pirelli Tyre S.P.A. Mail Date: Mar. 8, 2025 10 pages (English + Original).

Non-Final Office Action for U.S. Appl. No. 18/258,685, filed Jun. 21, 2023 for Pirelli Tyre S.P.A. Mail Date: May 14, 2025 17 pages.

Restriction Requirement for U.S. Appl. No. 18/258,443, filed Jun. 20, 2023 on behalf of Pirelli Tyre S.P.A. Mail Date: May 5, 2025 7 pages.

Non-Final Office Action for U.S. Appl. No. 18/258,443, filed Jun. 20, 2023 on behalf of Pirelli Tyre S.P.A Mail Date: Sep. 12, 2025 18 pages.

Notice of Allowance for U.S. Appl. No. 18/258,685, filed Jun. 21, 2023 for Pirelli Tyre S.P.A. Mail Date: Sep. 30, 2025 8 pages.

Corrected Notice of Allowability for U.S. Appl. No. 18/258,685, filed Jun. 21, 2023 for Pirelli Tyre S.P.A. Mail Date: Oct. 7, 2025 5 pages.

First Chinese Office Action for Chinese Application No. 202180088113 filed Dec. 28, 2021 on behalf of Pirelli Tyre S.P.A. Mail Date: Dec. 24, 2025 (English + Original) 18 pages.

* cited by examiner

PROCESS FOR BUILDING TYRES OF VEHICLE WHEELS AND METHOD FOR PROVIDING ELONGATED ELEMENTS TO BE USED IN THE AFOREMENTIONED PROCESS

CROSS REFERENCE TO RELATED APPLICATIONS

The present application is the US National Stage of International Patent Application No. PCT/IB2021/062382, filed on Dec. 28, 2021, which in turn, claims priority to Italian Application No. IT 102020000032582, filed on Dec. 29, 2020.

The present invention relates to a process for building tyres of vehicle wheels.

The invention also relates to a method and an apparatus for arranging elongated elements to be used in said process.

A tyre for vehicle wheels generally comprises a carcass structure, a crown structure arranged in radially outer position with respect to the carcass structure and a pair of sidewalls that represent the axially outer surfaces of the tyre, with respect to a mid-plane perpendicular to the rotation axis of said tyre.

The carcass structure comprises at least one carcass ply formed from reinforcing cords incorporated in a matrix of elastomeric material. The carcass ply has opposite end flaps respectively engaged with annular anchoring structures. The latter are arranged in the areas of the tyre usually identified with the name "beads" and are normally each formed by a substantially circumferential annular insert called "bead core" on which at least one filling insert is applied, in radially outer position, tapering radially going away from the rotation axis.

At the beads it is possible to provide specific reinforcing structures having the function of improving the transmission of torque to the tyre.

In the case of "tubeless" tyres, i.e. without an air chamber, a layer of elastomeric material, generally known as "liner", may also be provided in radially inner position with respect to the carcass structure to provide the necessary impermeability to the inflation air of the tyre. Generally, the liner extends from one bead to the other.

The crown structure comprises a belt structure and, in radially outer position with respect to the belt structure, a tread band made of elastomeric material.

The belt structure comprises one or more belt layers arranged radially juxtaposed over one another, having textile or metal reinforcing cords having orientation substantially parallel to the direction of circumferential extension of the tyre (zero degrees layer) and/or having crossed orientation.

Between the carcass structure and the belt structure it is possible to provide a layer of elastomeric material, called "under-belt", having the function of making the radially outer surface of the carcass structure as uniform as possible for the subsequent application of the belt structure.

Longitudinal and transverse grooves are typically shaped on the tread band, arranged to define a desired tread pattern. A so-called 'under-layer' made of elastomeric material of suitable properties to obtain a stable union between the belt structure and the tread band can be arranged between the tread band and the belt structure.

The sidewalls are made of elastomeric material and represent the axially outer surfaces with respect to the annular anchoring structures, to the carcass ply(-ies), to the belt layer(s) and possibly to at least one portion of tread band. For example, the sidewalls each extend from one of the side edges of the tread band up to the respective annular anchoring structure to the beads.

The sidewalls are intended to protect the carcass structure from atmospheric agents and lateral impacts (for example against curbs). In self-supporting tyres, suitable sidewall inserts are suitable for giving the tyre sufficient strength to adequately withstand the load of the vehicle when the tyre is used in a deflated state and for giving favourable properties of comfort when, on the other hand, the tyre is in normally-inflated operating conditions. A sidewall insert made of elastomeric material is preferably arranged in axially outer position with respect to the liner and in axially inner position with respect to each sidewall to define a structure suitable for adequately supporting the tyre in the deflated state, stopping the sidewall from yielding or bulging on itself, without compromising the normal travel conditions.

The term "elastomeric material" is meant to indicate a composition comprising at least one elastomeric polymer and at least one reinforcing filler. Preferably, such a composition also comprises additives like, for example, a cross-linking agent and/or a plasticizer. Thanks to the presence of the cross-linking agent, such a material can be cross-linked through heating, so as to form the end product.

The term "elongated element" is meant to indicate an element made of elastomeric material having predominant extension along a longitudinal direction thereof. Such an elongated element preferably consists of only elastomeric material.

The term "base surface" of the elongated element is meant to indicate the radially inner surface of each coil of elongated element when it is wound on a storage bobbin. Such a base surface corresponds to the lower surface of the elongated element once unwound from the storage bobbin and arranged on a substantially horizontal plane.

The term "elongation" of an elongated element is meant to indicate the extension of the elongated element along the longitudinal direction of extension thereof when subjected to a traction.

The term "elongated elements that are the same as each other" is meant to indicate elongated elements that have the same composition and geometry. Two elongated elements that are the same as each other consist of a same elastomeric material, have the same shape along a cross section perpendicular to the longitudinal direction of main extension and have the same dimensions along such a cross section. Two elongated elements that are the same as each other also have the same elongation, or in any case such that the elongation of a first elongated element is comprised between 99% and 101% of the elongation of a second elongated element when subjected to a same load in the longitudinal direction.

The term "elongated elements that are different from each other" is meant to indicate elongated elements that have different composition and/or geometry, in which, in combination or alternatively, the elastomeric materials are different in composition, the respective shapes along a cross section perpendicular to the longitudinal direction of main extension are different from each other, such sections have different dimensions. Two elongated elements that are different from each other can also have the same elongation, or in any case such that the elongation of a first elongated element is comprised between 99% and 101% of the elongation of a second elongated element when subjected to a same load in the longitudinal direction, or they can have a different elongation and such that the elongation of a first elongated element is less than 99% or greater than 101% of the elongation of a second elongated element, when subjected to a same load in the longitudinal direction.

The term "structural component" of a tyre is meant to indicate any portion thereof capable of carrying out its function or a part thereof. Examples of structural components of the tyre are the following: the carcass structure, the crown structure, or parts thereof, like liner, under-liner, anti-abrasive inserts, bead core, filling inserts in the area of the bead (and therefore the annular anchoring structures defined by bead cores and respective filling inserts), carcass ply(-ies), belt layer(s), belt under-layer, under-layer of the tread band, sidewalls, sidewall inserts, tread band, textile or metal reinforcements, reinforcing elements made of elastomeric material etc., or a part thereof.

The term "service fabric" is meant to indicate a fabric associated with an elongated element arranged to prevent coils of elongated element wound on a winding support from sticking together. Preferably, said service fabric is also configured to give the elongated element a desired structural consistency when it is wound on a winding support.

The term "self-supporting tyre" is meant to indicate a tyre that differs from a standard tyre in that it is capable of supporting the load of the vehicle under a considerable or total loss of pressure, for example when there is a puncture, allowing the driver to travel, for a certain distance, to reach a repair shop without having to stop to change the tyre in a potentially dangerous situation.

The term "angular unwinding speed" of a storage bobbin or of a winding support is meant to indicate the speed at which the storage bobbin or the winding support is set in rotation during the unwinding of an elongated element wound on it in coils.

The term "unwinding speed" of an elongated element from a storage bobbin or of a winding support is meant to indicate the linear speed of the point of the elongated element that passes from a spiral-shaped trajectory to a rectilinear trajectory tangent to the storage bobbin or to the winding support during the unwinding of the elongated element from the storage bobbin or from the winding support. Such a point of the elongated element is therefore, moment by moment, the point of the elongated element that, during said unwinding, stops being wound in a spiral on the storage bobbin or on the winding support. The unwinding speed is given by the product between the angular unwinding speed of the storage bobbin or of the winding support and the distance between such a point of the elongated element and the rotation axis of the storage bobbin or of the winding support.

The term "unwinding length" of an elongated element is meant to indicate the distance between a free end of an elongated element that first stops being wound in a spiral on the storage bobbin or on the winding support during the unwinding of the elongated element from the storage bobbin or from the winding support and a point of the same elongated element that, during said unwinding, passes from a spiral-shaped trajectory to a rectilinear trajectory tangent to the storage bobbin or to the winding support. The unwinding length increases during the unwinding of the elongated element from a storage bobbin or from a winding support. The unwinding length is given, at a moment $T1$, by the time integral between an initial moment and the moment $T1$ of the unwinding speed.

The term "winding diameter" of an elongated element on a storage bobbin or on a winding support is meant to indicate the distance between the rotation axis of the storage bobbin or of the winding support and the point of the elongated element still wound on the storage bobbin or on the winding support and radially farthest from said rotation axis.

The term "rotatably couple" or "rotatably coupled" is meant to indicate a coupling of two components such that the two components can rotate with respect to one another.

The term "constrain in rotation" or "constrained in rotation" is meant to indicate a coupling of two components such that the two components rotate as a unit.

The term "rotatable with friction" is meant to indicate a relative rotation of two components that ends after a few degrees of relative rotation, when the force that causes such a relative rotation ends. A rotation of one component with respect to another supported by bearings or other devices used to reduce friction is not encompassed by the definition of "rotatable with friction".

The terms "axial", "axially", "radial", "radially", "circumferential" and "circumferentially" are used with reference to winding supports used in the tyre building process.

In particular, the terms "axial" and "axially" are meant as references/sizes arranged/measured or extending in a substantially parallel direction to a geometric rotation axis of the winding supports.

The terms "radial" and "radially" are meant as references/sizes arranged/measured or extending in a substantially perpendicular direction to a geometric rotation axis of the winding supports and lying in a plane comprising such a geometric rotation axis.

The terms "radially inner/outer" are meant to indicate respectively a position closer to or further away from said geometric rotation axis of the winding supports.

The terms "axially inner/outer" are meant to indicate respectively a position closer to or further away from a mid-plane perpendicular to the geometric rotation axis of the winding supports.

The terms "circumferential" and "circumferentially" are meant as references/sizes arranged/measured or extending along a circumference that extends around the geometric rotation axis of the winding supports.

A tyre for vehicle wheels comprises a plurality of structural components made of elastomeric material. Non-limiting examples of these include: the tread band, the sidewalls, the sidewall inserts, the so-called under-belt and/or under-layer layers, the liner, the annular reinforcing inserts and others.

In production processes of tyres for vehicle wheels at least some of such structural components are made from elongated elements that are wound, in a building line, on a forming drum.

In the Applicant's experience, at least for some types of tyres there is simultaneous deposition on the forming drum of two elongated elements that are the same as each other. An example of such elongated elements deposited simultaneously on the forming drum is a pair of elongated elements that, during the building of a self-supporting tyre, are deposited axially spaced apart on the forming drum, before or after the deposition of one or more carcass plies, to make a respective pair of sidewall inserts of the self-supporting tyre.

The Applicant has observed that in order to simultaneously deposit two elongated elements that are the same as each other on a forming drum, a process is currently provided in which two elongated elements of a same elastomeric material are drawn simultaneously from a single extrusion device.

As the elongated elements progressively come out from the extrusion device, they are deposited on a storage bobbin positioned in the extrusion line substantially downstream of the extrusion device. The deposition of the elongated elements is performed by winding the elongated elements in coils on the storage bobbin, simultaneously making two pluralities of coils axially adjacent to one another and spaced apart on the storage bobbin. During the winding on the storage bobbin, the base surfaces of the elongated elements are coupled with a service fabric that avoids direct contact between the coils of a same elongated element preventing them from sticking together. The service fabric is unwound from a service bobbin during the coupling with the elongated elements.

The storage bobbin with both of the elongated elements that are the same as each other wound is then moved and housed in a storage and, when it is needed, it is taken from the storage and arranged in a building line close to the forming drum.

In the building line, both of the elongated elements that are the same as each other are simultaneously unwound from the storage bobbin and simultaneously deposited on the forming drum to simultaneously make the desired pair of structural components made of elastomeric material. During the unwinding of the elongated elements, the service fabric is separated from the base surface of the elongated elements and wound on a service bobbin.

The Applicant has tackled the problem of building tyres in which the two elongated elements simultaneously deposited on the forming drum are different from each other. Such a requirement could for example be needed, in the Applicant's experience, during the building of a self-supporting tyre in which the sidewall insert of one side of the tyre is different from the sidewall insert of the other side of the tyre. The Applicant has observed that it would not be possible to simultaneously deposit two elongated elements that are different from each other on the forming drum by actuating the process described above, since each storage bobbin comprises two elongated elements that are the same as each other.

The Applicant has however felt the need to simultaneously deposit two elongated elements that are different from each other on the forming drum without having to redesign or modify the extrusion line and/or the building line.

The Applicant has indeed realized that this would allow using pre-existing production plants, avoiding costs of redesigning, prototyping and production of new extrusion lines and new building lines. This would also allow avoiding to provide new production spaces to house new production plants in addition to those already existing.

The Applicant has observed that in order to be able to use the same extrusion lines already existing, every extrusion device would have to continue to be able to extrude pairs of elongated elements that are the same as each other and to wind each pair of elongated elements on a respective storage bobbin.

The Applicant has observed that in order to use the same building lines already existing it would be necessary to provide the building lines with storage bobbins with elongated elements that are different from each other wound on them.

The Applicant has however noted that elongated elements that are different from each other could have, for the same longitudinal length wound on the storage bobbin, winding diameters that are different from each other.

The Applicant has indeed noted that elongated elements that are different from each other in geometry could have different dimensions of the elongated elements in respective cross sections perpendicular to the longitudinal direction. Therefore, when two elongated elements that are different from each other in geometry are wound on the storage bobbin they generate, for the same longitudinal length wound on the storage bobbin, winding diameters that are different from each other.

The Applicant has also noted that, in order to use pre-existing extrusion devices, elongated elements that are different from each other in composition must be extruded at different times by a same extrusion device (after a change of elastomeric material to be extruded) or must be extruded by different extrusion devices (configured to extrude elastomeric materials that are different from each other). In the experience of the Applicant, the processing tolerances during the extrusion of elongated elements, although small in size, can cause slight differences in geometry between elongated elements extruded by an extrusion device at a first moment and elongated elements extruded by the same extrusion device after a change of elastomeric material to be extruded or between elongated elements extruded by different extrusion devices. In the experience of the Applicant, such slight differences in geometry can cause slight differences, in respective cross sections perpendicular to the longitudinal direction, between two elongated elements that are different from each other in composition. When, for the same longitudinal length wound on the storage bobbin, two elongated elements that are different from each other in composition are wound on the storage bobbin forming tens of coils, said slight differences in geometry determine winding diameters that are different from each other.

The Applicant has realized that elongated elements wound on a storage bobbin with different winding diameters could not be unwound simultaneously and with equal unwinding lengths.

The Applicant has indeed noted that, for the same angular unwinding speed, the elongated element that has the greater winding diameter would have a greater unwinding length and that, at the same time, the elongated element that has the smaller winding diameter would have a shorter unwinding length.

The Applicant has thus observed that two elongated elements that are different from each other in geometry and/or in composition should be unwound with different angular speeds to obtain simultaneous unwinding thereof with equal unwinding lengths.

The Applicant has finally found that by arranging a storage bobbin on which a first elongated element is wound and a storage bobbin on which a second elongated element different from the first is wound and by coupling together the two storage bobbins so that they are rotatable about a common rotation axis independently from one another, it is possible to simultaneously unwind elongated elements that are different from each other with equal unwinding lengths from the two storage bobbins and deposit them on the forming drum.

The present invention therefore relates, in a first aspect thereof, to a method for arranging elongated elements to be used in a process for building tyres for vehicle wheels.

Preferably, a first winding support is arranged with a first elongated element of a first type wound on it.

Preferably, a second winding support is arranged with a second elongated element of a second type different from the elongated element of the first type wound on it.

Preferably, a coupling device is arranged comprising a first coupling body.

Preferably, a coupling device is arranged comprising a second coupling body.

Preferably, it is provided for the first coupling body and the second coupling body to be rotatable about a rotation axis.

Preferably, the first coupling body and the second coupling body are rotatable about the rotation axis with respect to one another.

Preferably, the first winding support is arranged on the first coupling body.

Preferably, the second winding support is arranged on the second coupling body.

The Applicant deems that such a method allows to use pre-existing building lines configured to allow two elongated elements that are the same as each other to be wound simultaneously on a forming drum. The Applicant has indeed verified that by arranging the first winding support on the first coupling body of the coupling device and by arranging the second winding support on the second coupling body of the coupling device, the first winding support and the second winding support are rotatable with respect to one another and allows to simultaneously unwind two elongated elements that are different from each other, allowing the simultaneous winding on the forming drum of the two elongated elements that are different from each other.

The Applicant also deems that such a method can allow to use the extrusion lines already present in a plant and configured to extrude pairs of elongated elements that are the same as each other also in a process in which two elongated elements that are different from each other are deposited simultaneously on the forming drum.

The Applicant also deems that such a method allows to use pre-existing storages, since they are already configured to store winding supports with elongated elements wound on them.

In a second aspect thereof, the invention relates to a process for building tyres for vehicle wheels.

Such a process preferably comprises carrying out the method for arranging elongated elements in accordance with the first aspect of the present invention.

Preferably, the coupling device is arranged in a building line close to a forming drum.

Preferably, it is provided for to simultaneously unwind the first elongated element from the first winding support and the second elongated element from the second winding support.

Preferably, it is provided for to simultaneously deposit said first elongated element and said second elongated element on the forming drum.

The Applicant deems that, in this way, it is possible to simultaneously deposit a first elongated element and a second elongated element with winding diameters that are different from each other on a forming drum.

In a third aspect thereof, the invention relates to an apparatus for arranging elongated elements to be used in a process for building tyres for vehicle wheels.

Preferably, a first winding support is provided that is configured to receive a winding of a first elongated element of a first type.

Preferably, a second winding support is provided that is configured to receive a winding of a second elongated element of a second type.

Preferably, the second elongated element is different from the elongated element of the first type.

Preferably, a coupling device is provided comprising a first coupling body.

Preferably, the coupling device comprises a second coupling body.

Preferably, it is provided for the first coupling body and the second coupling body to be rotatable about a rotation axis.

Preferably, the first coupling body and the second coupling body are rotatable about the rotation axis with respect to one another.

Preferably, the first winding support can be mounted and dismounted from the first coupling body.

Preferably, the second winding support can be mounted and dismounted from the second coupling body.

In at least one of the aforementioned aspects, the present invention can have at least one of the preferred characteristics described hereinafter.

Preferably, arranging a coupling device comprises fitting the first coupling body on an inner hub extending coaxially to said rotation axis.

Preferably, arranging a coupling device comprises fitting the second coupling body on the inner hub.

Preferably, arranging a coupling device comprises rotatably coupling the first coupling body and the second coupling body with the inner hub.

The inner hub allows to support the first coupling body and the second coupling body in rotation.

The inner hub also allows to keep the first coupling body and the second coupling body axially aligned.

Preferably, the first coupling body is axially beside the second coupling body on the inner hub.

Preferably, fitting the first coupling body on the inner hub comprises rotatably coupling the first coupling body with a first satellite member able to rotate about a first satellite axis.

Preferably, fitting the second coupling body on the inner hub comprises connecting the second coupling body to the first satellite member in rotation.

Preferably, said first satellite axis is perpendicular to said rotation axis.

Preferably, said first satellite axis rotates about said rotation axis as a unit with said inner hub.

Preferably, arranging the first winding support on the first coupling body comprises fitting a first fixing bush on the inner hub.

Preferably, arranging the first winding support on the first coupling body comprises constraining the first fixing bush in rotation to the first winding support.

Preferably, arranging the first winding support on the first coupling body comprises making said first fixing bush rotatable with friction with respect to said inner hub.

Preferably, arranging the second winding support on the second coupling body comprises fitting a second fixing bush on the inner hub.

Preferably, arranging the second winding support on the second coupling body comprises constraining the second fixing bush in rotation to the second winding support.

Preferably, arranging the second winding support on the second coupling body comprises making said second fixing bush rotatable with friction with respect to said inner hub.

Preferably, during the rotation of the first coupling body with respect to the inner hub, said first and/or second fixing bush opposes an idle rotation of the first and/or second winding support.

Preferably, said first and/or second fixing bush allows a rotation of the first and/or second winding support with respect to the inner hub only when a mechanical moment is applied to the first and/or second winding support.

Preferably said first/second fixing bush is integral to said first/second winding support and to said first/second coupling body.

Preferably, simultaneously unwinding the first elongated element from the first winding support and the second elongated element from the second winding support comprises making the first coupling body rotate with a first angular speed about the rotation axis.

Preferably, simultaneously unwinding the first elongated element from the first winding support and the second elongated element from the second winding support comprises making the second coupling body rotate with a second angular speed about the rotation axis.

Preferably, the first angular speed is different from the second angular speed.

Preferably, rotating the first coupling body and the second coupling body about the rotation axis comprises setting the inner hub in rotation about the rotation axis through the effect of the rotation of the first coupling body and of the second coupling body rotatably coupled with the first satellite member.

Preferably, rotating the first coupling body comprises slowing down the first coupling body upon reaching a predetermined deposition length of said first elongated element on the forming drum.

Preferably, rotating the second coupling body comprises slowing down the second coupling body upon reaching a predetermined deposition length of said second elongated element on the forming drum.

Preferably, the reaching of the predetermined deposition length of the first and/or second elongated element is calculated as a final deposition length of the first and/or second elongated element on the forming drum minus a stopping transient deposition length.

Preferably, the stopping transient deposition length is given by the deposition length unwound between a moment of starting to slow down the rotation of the first and/or second coupling body and a moment of stopping the rotation of the first and/or second coupling body.

Alternatively, the reaching of the predetermined deposition length of the first and/or second elongated element is given by a final deposition length of the first and/or second elongated element on the forming drum.

Preferably, the predetermined deposition length of the first elongated element is equal to the predetermined deposition length of the second elongated element.

Preferably, slowing down the first coupling body and the second coupling body comprises slowing down the first coupling body and the second coupling body with the same deceleration.

Preferably, slowing down the first coupling body and the second coupling body with the same deceleration comprises unwinding a stopping transient deposition length of the first elongated element equal to a stopping transient deposition length of the second elongated element from the first winding support and from the second winding support.

Preferably, slowing down the first coupling body and the second coupling body with the same deceleration comprises applying a braking force with said braking member until the rotation of the first coupling body and of the second coupling body stops.

Preferably, the stopping of the rotation of the first coupling body is simultaneous to the stopping of the rotation of the second coupling body.

Preferably, the first elongated element is wound in coils on the first winding support.

Preferably, the second elongated element is wound in coils on the second winding support.

Preferably, the winding diameter of the first elongated element is greater than the winding diameter of the second elongated element.

Preferably, the first angular speed of the first coupling body is less than the second angular speed of the second coupling body.

Preferably, the first elongated element is associated with a first service fabric.

Preferably, the second elongated element is associated with a second service fabric.

Preferably, the first service fabric is the same as the second service fabric.

Preferably, unwinding the first elongated element from the first winding support comprises removing said first service fabric from the first elongated element.

Preferably, unwinding the second elongated element from the second winding support comprises removing said second service fabric from the second elongated element.

Preferably, the first service fabric removed from the first elongated element is collected on a collecting winding support.

Preferably, the second service fabric removed from the second elongated element is collected on the collecting winding support.

Preferably, unwinding the first elongated element from the first winding support takes place by means of a pulling action exerted on the first service fabric.

Preferably, unwinding the second elongated element from the second winding support takes place by means of a pulling action exerted on the second service fabric.

Preferably, the pulling action exerted on the first service fabric sets the first winding support in rotation.

Preferably, the rotation of the first winding support sets the first coupling body in rotation.

Preferably, the pulling action exerted on the second service fabric sets the second winding support in rotation.

Preferably, the rotation of the second winding support sets the second coupling body in rotation.

Preferably, the pulling action exerted on the first service fabric is simultaneous to the pulling action exerted on the second service fabric.

Preferably, the pulling action exerted on the first service fabric is equal in intensity to the pulling action exerted on the second service fabric.

Preferably, the coupling device comprises an inner hub extending coaxially to the rotation axis.

Preferably, said first coupling body is rotatably coupled with said inner hub.

Preferably, said second coupling body is rotatably coupled with said inner hub.

Preferably, the coupling device comprises a first satellite member.

Preferably, the first satellite member is rotatable about a first satellite axis.

Preferably, the first coupling body and the second coupling body are rotatably coupled with said first satellite member to rotate about said rotation axis.

Preferably, the coupling device comprises a first fixing bush.

Preferably, said first fixing bush can be fitted on the inner hub.

Preferably, said first fixing bush can be constrained in rotation to the first winding support.

Preferably, said first bush is rotatable with friction with respect to the inner hub.

Preferably, the coupling device comprises a second fixing bush.

Preferably, said second fixing bush can be fitted on the inner hub.

Preferably, said second fixing bush can be constrained in rotation to the second winding support.

Preferably, said second fixing bush is rotatable with friction with respect to the inner hub.

Preferably, arranging a coupling device comprises arranging a braking member active on the inner hub.

Preferably, the coupling device comprises a braking member active on the inner hub to slow down the rotation of the inner hub about said rotation axis.

Further characteristics and advantages of the present invention will become clearer from the following detailed description of preferred embodiments thereof, made with reference to the attached drawings.

Figure 1:
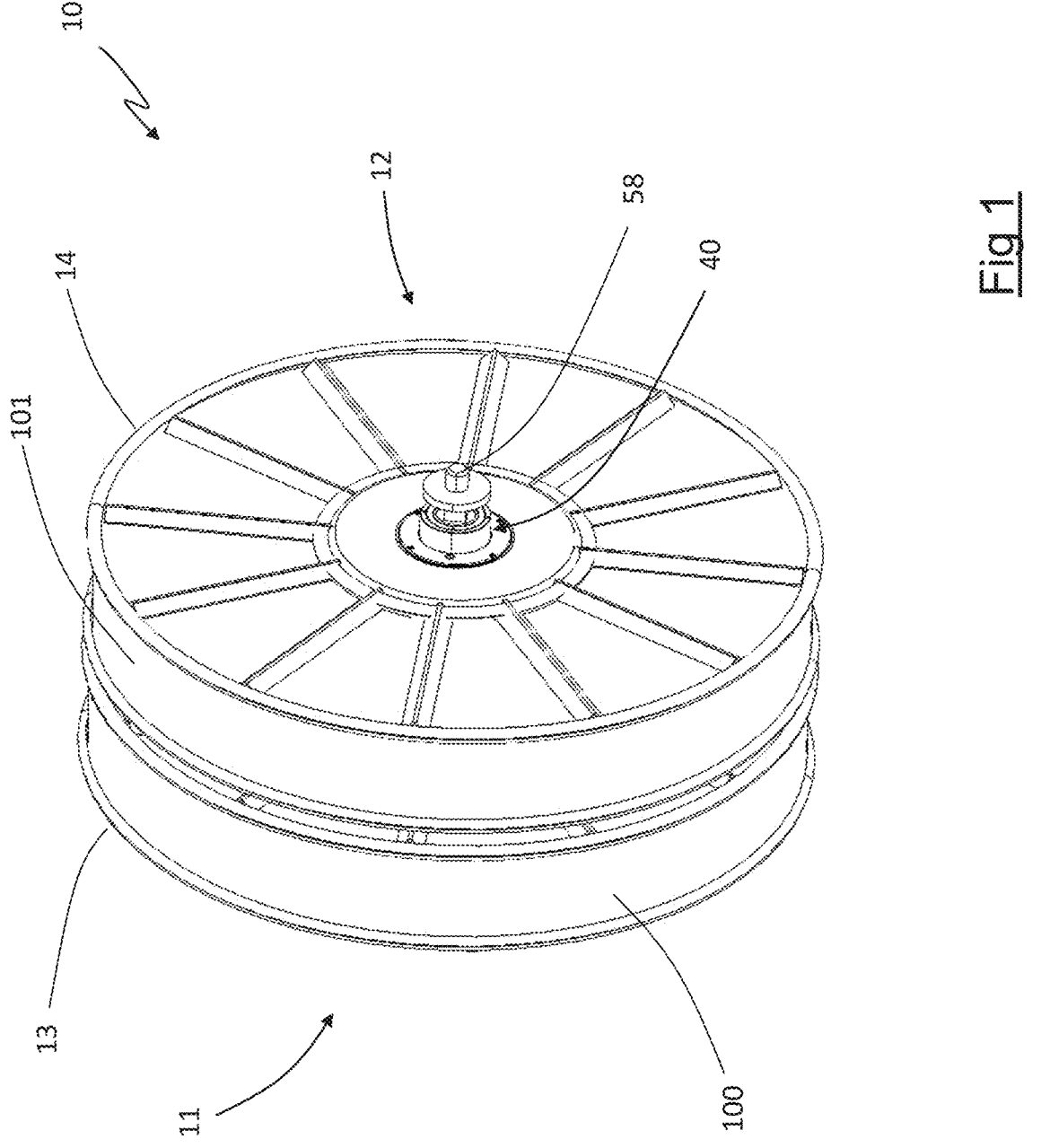
FIG. 1 is a schematic representation of a part of an apparatus for arranging elongated elements in a process for building tyres for vehicle wheels in accordance with the present invention.

With reference to FIG. 1, a part of an apparatus 10 for building tyres for vehicle wheels in accordance with the present invention is shown.

As shown in FIG. 1 the apparatus 10 comprises a first winding support 11 and a second winding support 12. A first elongated element 100 is wound in coils on the first winding support 11 and a second elongated element 101 is wound in coils on the second winding support 12.

The first winding support 11 is connected to the second winding support 12 through a coupling device 40 also part of the apparatus 10.

In the preferred embodiment of the invention, the first winding support 11 and the second winding support 12 respectively comprise a first storage bobbin 13 and a second storage bobbin 14.

Figure 3:
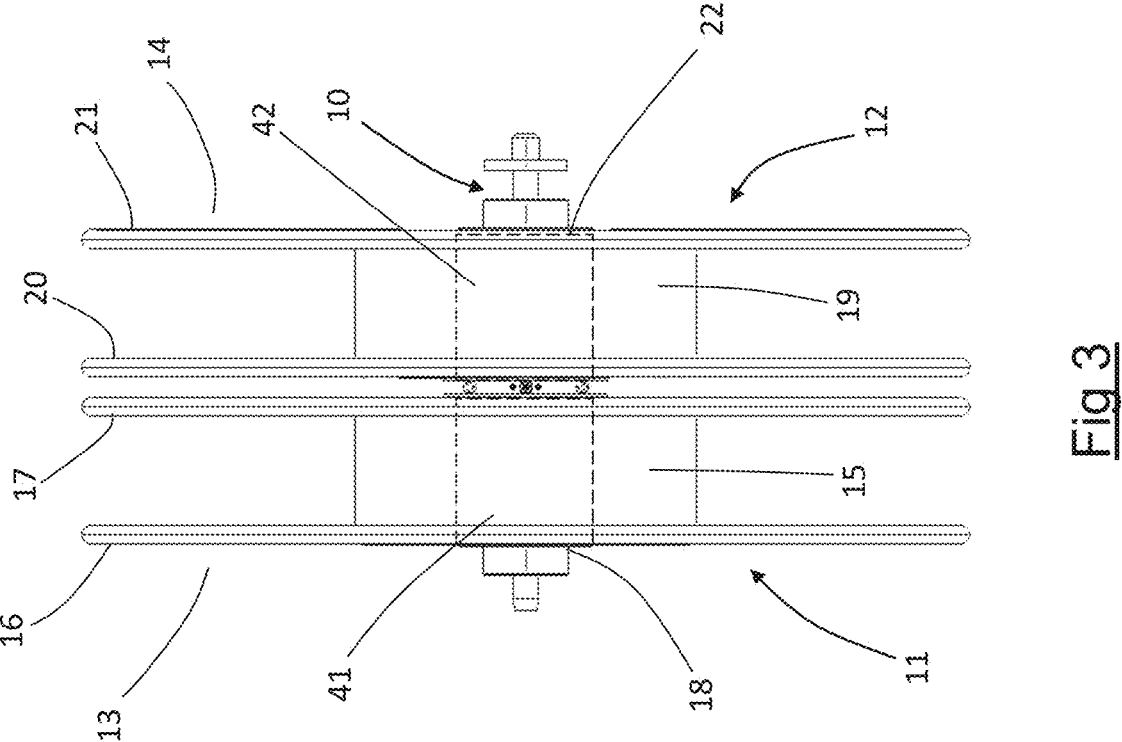
FIG. 3 is a front view of the part of apparatus of FIG. 1.

As shown in FIG. 3 (where the elongated elements have not been represented), each storage bobbin 13, 14 comprises a winding surface 15, 19 sized to receive the respective elongated element 100, 101. The winding surface 15, 19 is axially delimited by a first annular body 16, 20 and by a second annular body 17, 21. The winding surface 15, 19 is substantially cylindrical and extends around a through cavity 18, 22 able to be crossed by the coupling device 40.

The first annular body 20 of the second storage bobbin 14 is axially adjacent to the second annular body 17 of the first storage bobbin 13.

The first elongated element 100 is wound in coils on the first storage bobbin 13 with a first service fabric 200 associated with a base surface 100a of the first elongated element 100.

The second elongated element 101 is wound in coils on the second storage bobbin 14 with a second service fabric 201 associated with a base surface 101a of the second elongated element 101.

The first service fabric 200 and the second service fabric 201 are tape-like elements axially sized to each couple with a respective elongated element and are the same as each other. The first service fabric 200 and the second service fabric 201 are preferably made of polythene, nylon, Mylar®, polyester, or Meraklon®.

Figure 4:
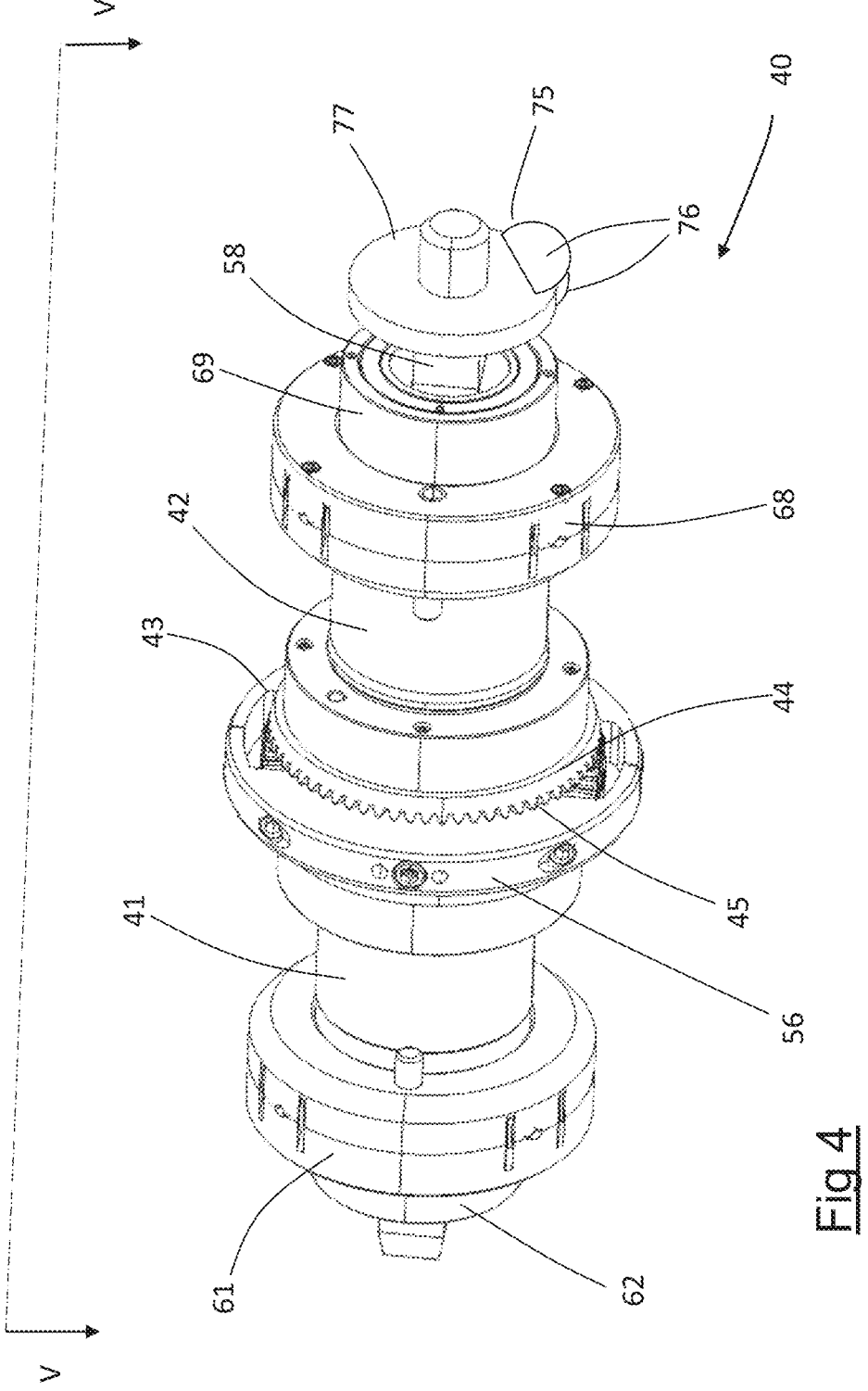
FIG. 4 is a perspective view of a component of the part of apparatus of FIG. 1.
Figure 5:
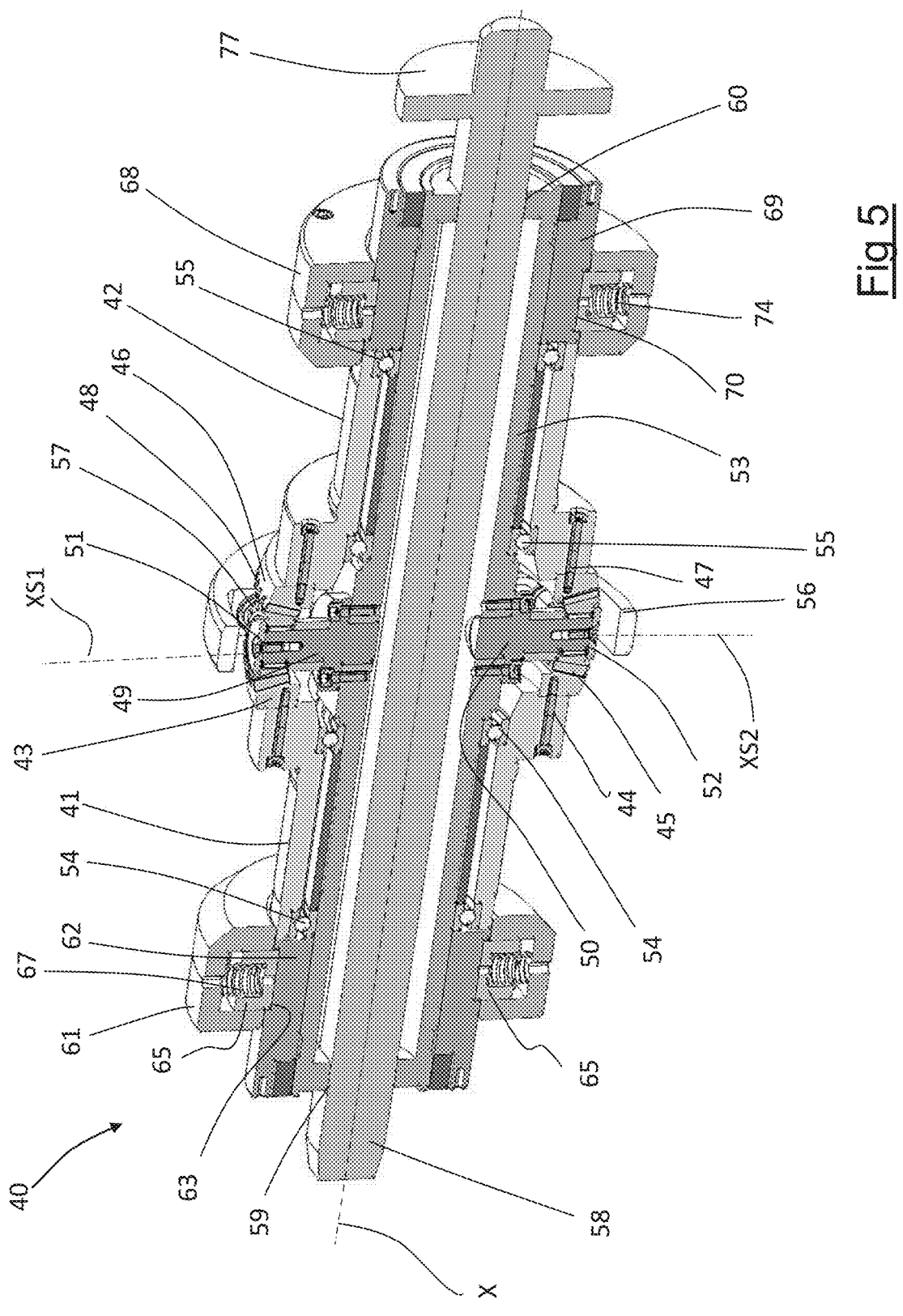
FIG. 5 is a section view along the plane V-V of the component of FIG. 4.

As illustrated in FIGS. 3-5, the coupling device 40 comprises a first coupling body 41 and a second coupling body 42 rotatable about a rotation axis X. The first storage bobbin 13 is mounted on the first coupling body 41 to rotate about the rotation axis X and the second storage bobbin 14 is mounted on the second coupling body 42 to rotate about the rotation axis X.

The first coupling body 41 is rotatable about the rotation axis X with respect to the second coupling body 42.

The first coupling body 41 and the second coupling body 42 are fitted on an inner hub 53. As illustrated in FIG. 5, the first coupling body 41 is rotatable about the rotation axis X with respect to the inner hub 53 through a first pair of bearings 54 and the second coupling body 42 is rotatable about the rotation axis X with respect to the inner hub 53 through a second pair of bearings 55.

The first coupling body 41 comprises a toothed crown 43 arranged at an axially inner end 44 of the first coupling body 41. The toothed crown 43 comprises a plurality of teeth 45 having axial extension oriented towards the second coupling body 42, as shown in FIGS. 4 and 5. Similarly the second coupling body 42 comprises a toothed crown 46 arranged at an axially inner end 47 of the second coupling body 42. The toothed crown 47 comprises a plurality of teeth 48 having axial extension oriented towards the first coupling body 41, as shown in FIG. 5.

In axially intermediate position between the toothed crowns 43, 46 the coupling device 40 comprises a first satellite body 49 and a second satellite body 50 diametrically opposite to the first satellite body 49. The first satellite body 49 and the second satellite body 50 respectively comprise a first satellite member 51 and a second satellite member 52. The first satellite member 51 is simultaneously meshed with the teeth 45 of the toothed crown 43 of the first coupling body 41 and with the teeth 48 of the toothed crown 46 of the second coupling body 42. Similarly, the second satellite member 52 is simultaneously meshed with the teeth 45 of the toothed crown 43 of the first coupling body 41 and with the teeth 48 of the toothed crown 46 of the second coupling body 42. The first satellite member 51 and the second satellite member 52 have the shape of toothed wheels, as shown in FIG. 5.

The first satellite member 51 and the second satellite member 52 are rotatable about respective satellite axes XS1, XS2 perpendicular to the rotation axis X and preferably coinciding with each other.

The first satellite body 49 and the second satellite body 50 are constrained to the inner hub 53 in diametrically opposite positions. The first coupling body 41 and the second coupling body 42 therefore rotate with respect to one another through the coupling between the first satellite member 51 and the second satellite 52 and the respective toothed crowns 43, 46 while they rotate, simultaneously with respect to the inner hub 53.

The coupling device 40 also comprises an annular body 56 arranged radially outside the first satellite member 49 and the second satellite member 50. The annular body 56 is axially aligned with the first satellite body 49 and with the second satellite body 50. The annular body 56 is rigidly connected to the inner hub 53 so as to rotate with it about the rotation axis X. On the annular body 56 a plurality of pins 57 are provided that are radially movable between a first position and a second position. In the first position, the pins 57 are moved away from, and do not interfere with, the first satellite member 51 and/or with the second satellite member 52 allowing the mutual rotation between the first coupling body 41 and the second coupling body 42 and the first coupling body 41 and second coupling body 42 with respect to the inner hub 53. In the second position, the pins 57 mechanically interfere with the first satellite member 51 and/or with the second satellite member 52. In this position of the pins 57, the first satellite member 51 and the second satellite member 52 are fixed and cannot rotate with respect to the inner hub 53 and therefore the mutual rotation between the first coupling body 41 and the second coupling body 42 is prevented. In this position, the first coupling body 41 and the second coupling body 42 rotate as a unit with each other and with the inner hub 53 making a locked condition of the first coupling body 41 and of the second coupling body 42.

The coupling device 40 also comprises a hub pin 58 visible in FIGS. 1, 3, 4 and better represented in FIG. 5. The inner hub 53 is fixedly connected to the hub pin 58. The hub pin 58 extends axially beyond the first coupling body 41 and beyond the second coupling body 42. In the preferred embodiment, the hub pin 58 has a substantially polygonal shape in section, for example square, and is inserted in axial end holes 59, 60 of the inner hub 53 counter-shaped to the shape in section of the hub pin 58. In this way, the hub pin 58 rotates as a unit about the rotation axis X with the inner hub 53.

The coupling device 40 also comprises a first fixing bush 61 removably fitted on the inner hub 53 at an axial end portion thereof. The fixing bush 61 is arranged in axially outer position with respect to the first coupling body 41. In axially outer position with respect to the first coupling body 41 an annular spacer 62 is arranged fitted onto the inner hub 53 and stably constrained to it. The annular spacer 62 comprises a radially outer annular groove 63. The first fixing bush 61 is fitted onto the annular spacer 62 at the radially outer annular groove 63.

Figure 6:
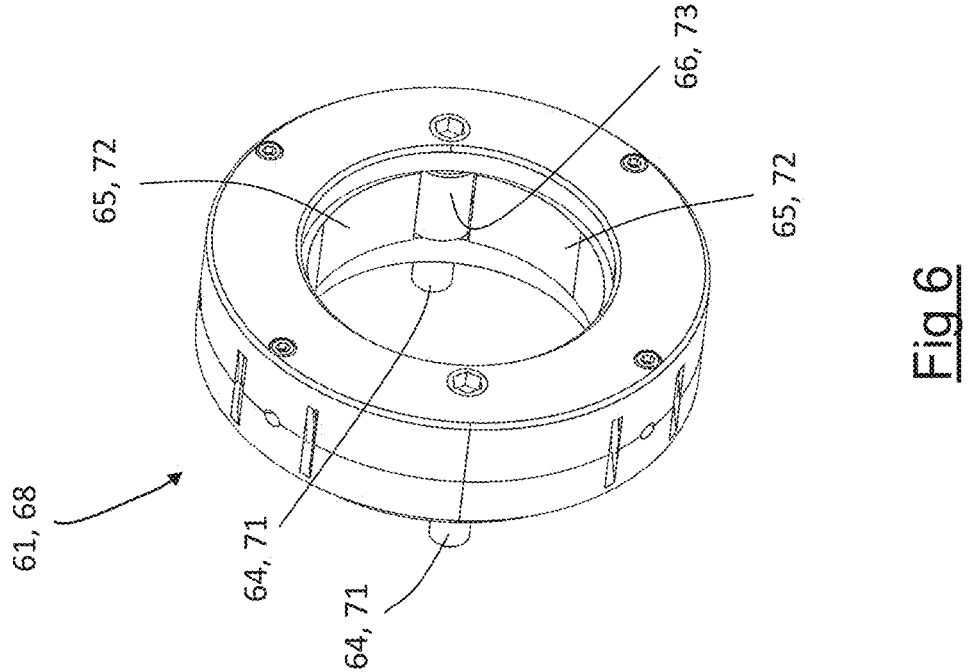
FIG. 6 is a perspective view of a detail of the component of FIG. 4.

As better illustrated in FIG. 6, the first fixing bush 61 comprises a pair of pegs 64 that extend axially and that are configured to insert in holes (not illustrated) of the first storage bobbin 13 to constrain the first fixing bush 61 in rotation to the first storage bobbin 13. The first fixing bush 61 also comprises a pair of radially inner jaws 65 configured to insert into the radially outer annular groove 63 of the annular spacer 62. The two jaws 65 are movable between a first condition in which they are inserted in the radially outer annular groove 63 and a second condition in which they are not inserted in the radially outer annular groove 63.

In the first condition, the jaws 65 axially lock the first fixing bush 61 with respect to the annular spacer 62 and with respect to the first coupling body 41 and axially lock the first storage bobbin 13 on the first coupling body 41. In the first condition, moreover, the jaws 65 contact the radially outer surface of the annular spacer 62 preventing a frictionless rotation of the first fixing bush 61 with respect to the annular spacer 62 and thus of the first storage bobbin 13 with respect to the inner hub 53. In other words, in the first condition the jaws 65 allow the rotation of the first fixing bush 61 with respect to the annular spacer 62 only in the case in which between the first fixing bush 61 and the annular spacer 62 a mechanical moment is applied that is capable of overcoming the friction force between the jaws 65 and the radially outer surface of the annular spacer 62.

In the second condition, the jaws 65 allow the first fixing bush 61 to be withdrawn from the annular spacer 62 to remove the first storage bobbin 13 from the first coupling body 41. In order to switch the jaws 65 between the first condition and the second condition (and vice-versa), the first fixing bush 61 comprises two eccentric sliders 66 (only one of which is visible in FIG. 6) arranged between the two jaws 65. By rotating the sliders 66 about an axis parallel to the rotation axis X, the two sliders 66 push the two jaws 65 in radially outer direction in contrast to elastic elements 67 (visible in FIG. 5) freeing the radially outer annular groove 63 of the annular spacer 62 from the jaws 65 or allow the jaws 65 to be pushed in a radially inner direction by the elastic members 67 and thus to be inserted in the radially outer annular groove 63 of the annular spacer 62.

Similarly, the coupling device 40 comprises a second fixing bush 68 removably arranged about the inner hub 53 at an axial end portion thereof. The fixing bush 68 is arranged in axially outer position with respect to the second coupling body 42. In axially outer position with respect to the second coupling body 42 an annular spacer 69 is arranged fitted onto the inner hub 53 and stably constrained to it. The annular spacer 69 comprises a radially outer annular groove 70. The second fixing bush 68 is fitted onto the annular spacer 69 at the radially outer annular groove 70. As better illustrated in FIG. 6, the second fixing bush 68 comprises a pair of pegs 71 that extend axially and that are configured to insert in holes (not illustrated) of the second storage bobbin 14 to constrain the second fixing bush 68 in rotation to the second storage bobbin 14. The second fixing bush 68 also comprises a pair of radially inner jaws 72 configured to insert into the radially outer annular groove 70 of the annular spacer 69. The two jaws 72 are movable between a first condition in which they are inserted in the radially outer annular groove 70 and a second condition in which they are not inserted in the radially outer annular groove 70.

In the first condition, the jaws 72 axially lock the second fixing bush 68 with respect to the annular spacer 69 and with respect to the second coupling body 42 and axially lock the second storage bobbin 14 on the second coupling body 42. In the first condition, moreover, the jaws 72 contact the radially outer surface of the annular spacer 69 preventing a frictionless rotation of the second fixing bush 68 with respect to the annular spacer 69 and thus of the second storage bobbin 14 with respect to the inner hub 53. In other words, in the first condition the jaws 72 allow the rotation of the second fixing bush 68 with respect to the annular spacer 69 only in the case in which between the second fixing bush 68 and the annular spacer 69 a mechanical moment is applied that is capable of overcoming the friction force between the jaws 72 and the radially outer surface of the annular spacer 69.

In the second condition, the jaws 72 allow the second fixing bush 68 to be withdrawn from the annular spacer 69 to remove the second storage bobbin 14 from the second coupling body 42. In order to switch the jaws 72 between the first condition and the second condition (and vice-versa), the second fixing bush 68 comprises two eccentric sliders 73 (only one of which is visible in FIG. 6) arranged between the two jaws 72. By rotating the sliders 73 about an axis parallel to the rotation axis X, the two sliders 73 push the two jaws 72 in radially outer direction in contrast to elastic elements 74 (visible in FIG. 5) freeing the radially outer annular groove 70 of the annular spacer 69 from the jaws 72 or allow the jaws 72 to be pushed in a radially inner direction by the elastic members 74 and thus to be inserted in the radially outer annular groove 70 of the annular spacer 69.

On the inner hub 53 it is possible to activate a braking member 75 (schematically illustrated in FIG. 4). The braking member 75 can be a pair of brake calipers 76 active on a disc-shaped portion 77 fixedly connected to the hub pin 58 and arranged at an axial end thereof.

The first elongated element 100 and the second elongated element 101 respectively wound on the first winding support 11 and on the second winding support 12 have winding diameters that are different to each other. The coupling device 40 allows to unwind the first elongated element 100 and the second elongated element 101 simultaneously and with equal unwinding lengths.

Figure 2:
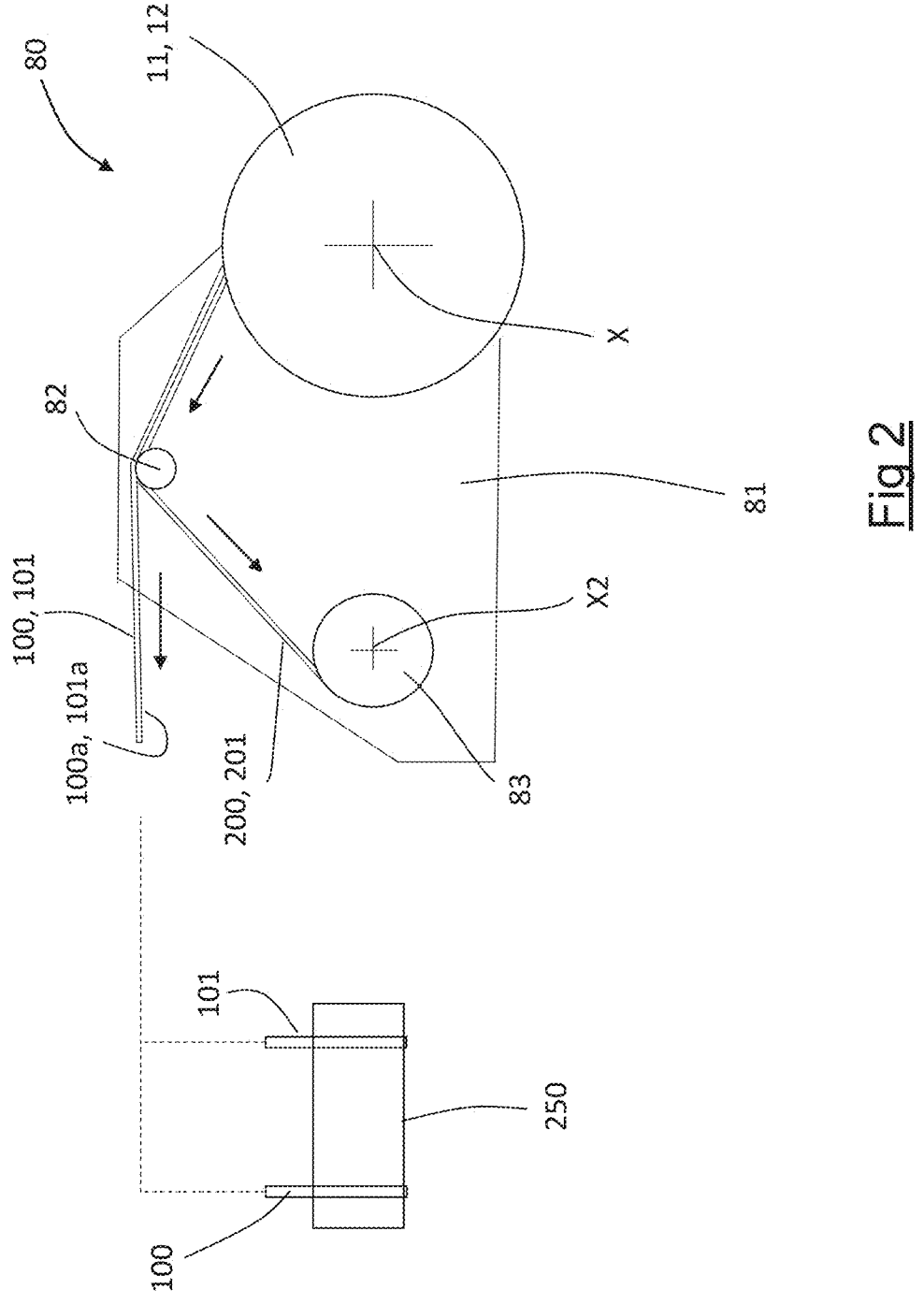
FIG. 2 is a schematic representation of a further part of the apparatus of FIG. 1 in an operating condition thereof.

With regard to this, the apparatus 10 comprises an unwinding device 80 (schematically illustrated in FIG. 2).

The unwinding device 80 operates simultaneously on the first winding support 11 and on the second winding support 12.

The unwinding device 80 comprises a frame 81 on which the coupling device 40 comprising the first storage bobbin 13 and the second storage bobbin 14 can be mounted and dismounted. The unwinding device 80 also comprises an unwinding roller 82.

In the unwinding device 80 the first elongated element 100 and the second elongated element 101 are simultaneously unwound and decoupled from the first service fabric 200 and from the second service fabric 201 to be able to be deposited on a forming drum 250. It is also possible to mount and dismount a collecting winding support 83 able to rotate about a rotation axis X2 parallel to the rotation axis X of the coupling device 40 on the frame 81.

The collecting winding support 83 is configured to wind the first service fabric 200 and the second service fabric 201. The first service fabric 200 and the second service fabric 201 are fed to the collecting winding support 83 from the unwinding roller 82 at which for example the first service fabric 200 and the second service fabric 201 are decoupled from the base surface 100*a* of the first elongated element 100 and from the base surface 101*a* of the second elongated element 101.

This activity can be carried out by motorizing the rotation axis X2 of the collecting winding support 83 and leaving the unwinding roller 82 idle. Alternatively, both the rotation axis X2 of the collecting winding support 83 and the unwinding roller 82 can be motorized.

In both cases, the unwinding of the first elongated element 100 and of the second elongated element 101 from the first winding support 11 and from the second winding support 12 is carried out by exerting a pulling or traction action on the first service fabric 200 and on the second service fabric 201 (by the collecting winding support 83 or by the unwinding roller 82).

Such a pulling action sets the first storage bobbin 13 and the second storage bobbin 14 and therefore the first coupling body 41 and the second coupling body 42 in rotation about the rotation axis X.

The hub pin 58 is free to rotate about the rotation axis X making the inner hub 53 rotate freely with respect to the frame 81. During such a rotation the angular speeds of the first coupling body 41 and of the second coupling body 42 take on values that are different from each other. In particular, the first coupling body 41, and therefore the first storage bobbin 13, rotates at a first angular speed and the second coupling body 41, and therefore the second storage bobbin 13, rotates at a second angular speed. Since the pulling action on the first service fabric 200 is equal to the pulling action on the second service fabric 201, the unwinding speed of the first elongated element 100 is equal to the unwinding speed of the second elongated element 101 and the first angular speed is different from the second angular speed. In particular, the angular speed of the storage bobbin in which the elongated element wound in it has a smaller winding diameter is greater than the angular speed of the storage bobbin in which the elongated element wound in it has a greater winding diameter.

By activating the braking member 75 so that the inner hub 53 can in any case rotate subjected to the pulling action exerted by the service fabrics 200, 201, it is also possible to keep the service fabrics 200, 201 constantly at the same tension during the unwinding thereof. Indeed, the coupling between the first toothed crown 43 (and the second toothed crown 46) with the first coupling body 41 and with the second coupling body 42 and the rotation of the first coupling body 41 and of the second coupling body 42 with respect to the inner hub 53, allows the braking torque exerted on the inner hub 53 (by means of the hub pin 58) to continue to keep equal unwinding speed of both of the elongated elements 100, 101 and therefore equal tensions of the service fabrics 200, 201.

Once a predetermined unwinding length of the first elongated element 100 and of the second elongated element 101 has been reached, the hub pin 58 is braked until the rotation thereof is stopped. Once such a predetermined unwinding length of the first elongated element 100 and of the second elongated element 101 has been reached, the pulling action exerted on the first service fabric 200 and on the second service fabric 201 is also preferably decreased.

The braking of the hub pin 58 is carried out by actuating the braking member 75. The braking torque is distributed by the coupling device 40, as stated, between the first coupling body 41 and the second coupling body 42. The first coupling body 41 and the second coupling body 42 consequently slow down their angular speed but continuing to keep equal unwinding speeds of both of the elongated elements until the first storage bobbin 13 and the second storage bobbin 14 are simultaneously stopped. This allows to calculate or calibrate the braking of the hub pin 58 to obtain equal and preferably predetermined unwinding lengths of the first elongated element 100 and of the second elongated element 101 also during the stopping transient of the rotation of the storage bobbins 13, 14.

The locked condition of the first coupling body 41 and of the second coupling body 42 can be used, as an alternative to what has been stated above, to unwind simultaneously and with equal unwinding lengths the first elongated element 100 and the second elongated element 101 in the case in which they have equal winding diameters.

The present invention has been described with reference to some preferred embodiments. Different modifications can be made to the embodiments described above, whilst still being encompassed by the scope of protection of the invention, defined by the following claims.

The invention claimed is:

1. A method for arranging elongated elements to be used in a process for building tyres for vehicle wheels, comprising:

preparing a first winding support by winding a first elongated element of a first type in coils on the first winding support;

preparing a second winding support by winding a second elongated element of a second type different from the elongated element of the first type in coils on the second winding support;

arranging a coupling device comprising a first coupling body and a second coupling body rotatable with respect to one another about a rotation axis and further comprising fitting the first coupling body and the second coupling body on an inner hub extending coaxially to said rotation axis and rotatably coupling the first coupling body and the second coupling body with the inner hub; and mounting the first winding support prepared with the first elongated element wound in coils thereon onto the first coupling body and mounting the second winding support prepared with the second elongated element wound in coils thereon onto the second coupling body, wherein the first coupling body and the second coupling body are configured to unwind the first elongated element from the first coupling body at a first angular speed and to simultaneously unwind the second elongated element from the second coupling body in a same unwinding direction and with a second angular speed, wherein the first angular speed is different from the second angular speed.

2. The method according to claim 1, wherein fitting the first coupling body and the second coupling body on the inner hub comprises rotatably coupling the first coupling body and the second coupling body with a first satellite member configured to rotate about a first satellite axis, wherein said first satellite axis is perpendicular to said rotation axis and rotates about said rotation axis as a unit with said inner hub.

3. The method according to claim 1, wherein mounting the first winding support on the first coupling body comprises fitting a first fixing bush on said inner hub, constraining said first fixing bush in rotation to the first winding support and making said first fixing bush rotatable with friction with respect to said inner hub.

4. The method according to claim 1, wherein mounting the second winding support on the second coupling body comprises fitting a second fixing bush on said inner hub, constraining said second fixing bush in rotation to the second winding support and making said second fixing bush rotatable with friction with respect to said inner hub.

5. The method according to claim 1, wherein arranging the coupling device comprises arranging a braking member active on the inner hub to slow down rotation of the inner hub about said rotation axis.

6. The method according to claim 1, wherein the first elongated element is wound with a first winding diameter on the first winding support, wherein, and wherein the second elongated element is wound with a second winding diameter on the second winding support, and wherein said first winding diameter is different from said second winding diameter.

7. A process for building tyres for vehicle wheels comprising:
performing the method for arranging elongated elements according to claim 1;
arranging the coupling device in a building line close to a forming drum;
simultaneously unwinding the first elongated element from the first winding support and the second elongated element from the second winding support; and
simultaneously laying down said first elongated element and said second elongated element on the forming drum.

8. The process according to claim 7, wherein simultaneously unwinding the first elongated element from the first winding support and the second elongated element from the second winding support comprises rotating the first coupling body about the rotation axis at the first angular speed and rotating the second coupling body about the rotation axis at the second angular speed different from the first angular speed.

9. The process according to claim 8, wherein rotating the first coupling body and the second coupling body about the rotation axis comprises setting the inner hub in rotation about the rotation axis through the effect of the rotation of the first coupling body and of the second coupling body rotatably coupled with the first satellite member.

10. The process according to claim 8, wherein rotating the first coupling body and the second coupling body comprises slowing down the first coupling body and the second coupling body once a predetermined deposition length of said first elongated element and said second elongated element has been reached on the forming drum.

11. The process according to claim 10, wherein slowing down the first coupling body and the second coupling body comprises slowing down the first coupling body and the second coupling body with a same deceleration.

12. The process according to claim 11, wherein slowing down the first coupling body and the second coupling body with the same deceleration comprises applying a braking force with a braking member until the rotation of the first coupling body and of the second coupling body stops.

* * * * *